United States Patent
Salzburger et al.

(10) Patent No.: US 11,140,312 B2
(45) Date of Patent: Oct. 5, 2021

(54) LONG-RANGE OPTICAL DEVICE WITH IMAGE CAPTURING CHANNEL

(71) Applicant: Swarovski-Optik KG., Absam (AT)

(72) Inventors: Thomas Salzburger, Stans (AT); Christoph Heinrich, Aldrans (AT); Christoph Frech, Thaur (AT); Daniel Nindl, Innsbruck (AT); Helmut Wiedermann, Pill (AT); Gerd Schreiter, Wattenberg (AT)

(73) Assignee: Swarovski-Optik KG.

( * ) Notice: Subject to any disclaimer, the term of this patent is extended or adjusted under 35 U.S.C. 154(b) by 0 days.

(21) Appl. No.: 16/931,981

(22) Filed: Jul. 17, 2020

(65) Prior Publication Data
US 2021/0021755 A1    Jan. 21, 2021

(30) Foreign Application Priority Data
Jul. 19, 2019   (AT) ............... A 50657/2019

(51) Int. Cl.
| H04N 5/232 | (2006.01) |
| H04N 1/00 | (2006.01) |
| H04N 5/225 | (2006.01) |
| G02B 7/02 | (2021.01) |
| G02B 7/04 | (2021.01) |

(52) U.S. Cl.
CPC ..... *H04N 5/23216* (2013.01); *H04N 1/00307* (2013.01); *H04N 5/2253* (2013.01); *H04N 5/23293* (2013.01); *G02B 7/021* (2013.01); *G02B 7/04* (2013.01); *H04N 2201/0055* (2013.01); *H04N 2201/0084* (2013.01)

(58) Field of Classification Search
CPC .................................................. H04N 5/23216
USPC ........................................................ 348/207.1
See application file for complete search history.

(56) References Cited

U.S. PATENT DOCUMENTS

2003/0184879 A1 * 10/2003 Hirunuma ............... G02B 7/06
                                                                 359/694
2003/0190163 A1   10/2003 Hirunuma et al.
(Continued)

FOREIGN PATENT DOCUMENTS

| DE | 10316133 A1 | 10/2003 |
| DE | 10245395 A1 | 4/2004 |
| DE | 102006037599 A1 | 2/2008 |

*Primary Examiner* — Joel W Fosselman
(74) *Attorney, Agent, or Firm* — Lerner, David, Littenberg, Krumholz & Mentlik, LLP

(57) ABSTRACT

The invention relates to a long-range optical device comprising at least one sight channel and an image capturing channel with a camera module, wherein the sight channel and the image capturing channel are coupled to one another by means of an adjusting mechanism such that a first image detail observed in the sight channel essentially corresponds to a second image detail captured by the camera module; at least one interface module for establishing a connection with an electronic terminal; a processing unit; at least one memory unit, wherein the memory unit is formed for storing parameters and/or functions, wherein an electronic operating button is provided for retrieving a preselected parameter and carrying out a function. The invention moreover relates to an observation and image capturing system and a method for the retrieval of parameters and/or the execution of functions with an observation and image capturing system.

23 Claims, 7 Drawing Sheets

(56) References Cited

U.S. PATENT DOCUMENTS

| | | |
|---|---|---|
| 2004/0095471 A1 | 5/2004 | Heintz |
| 2008/0036912 A1 | 2/2008 | Schreiter et al. |
| 2013/0194435 A1* | 8/2013 | Lupher .................. G03B 29/00 348/207.1 |

* cited by examiner

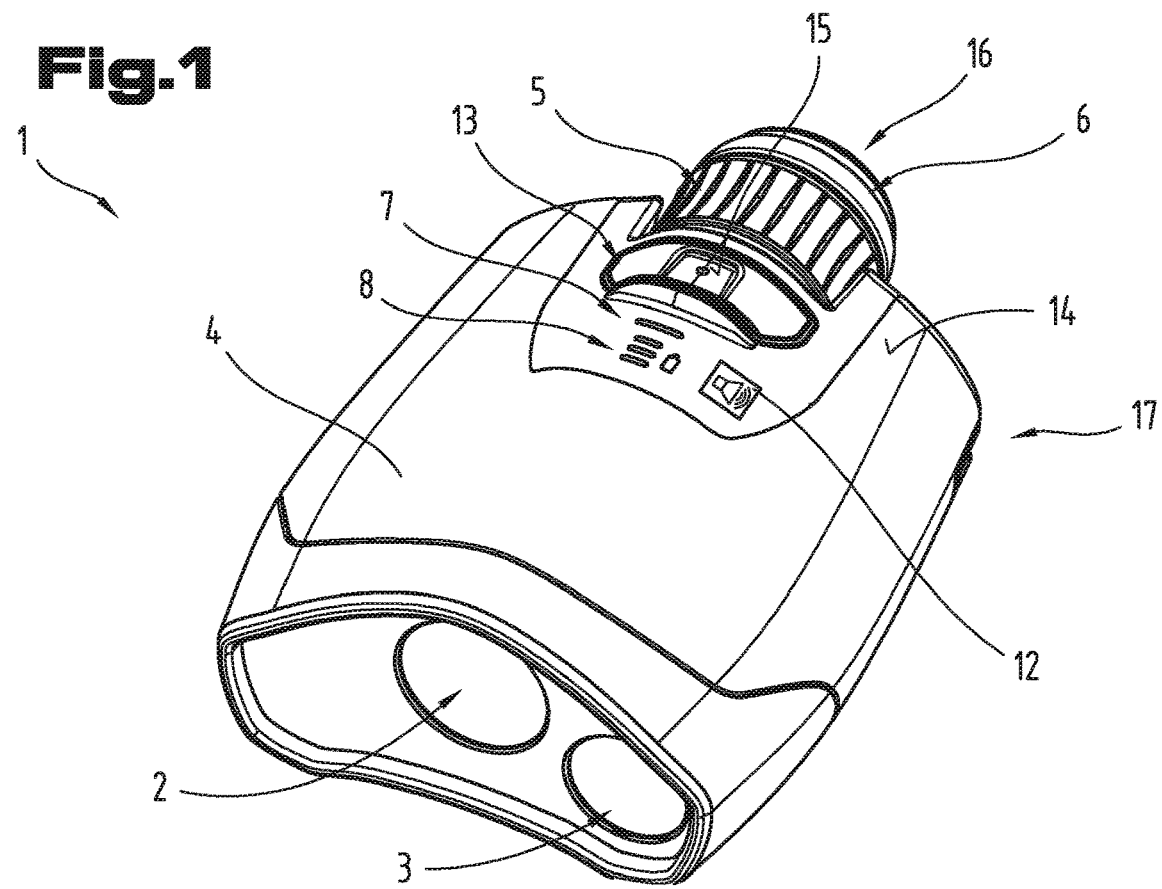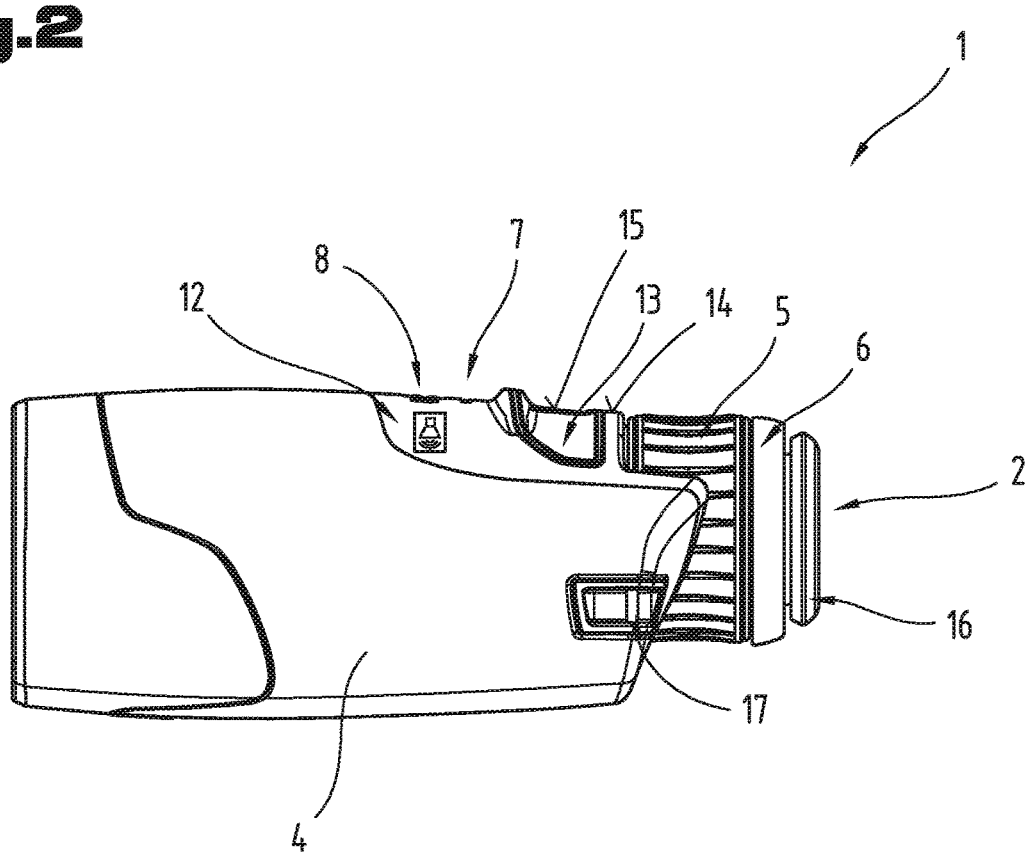

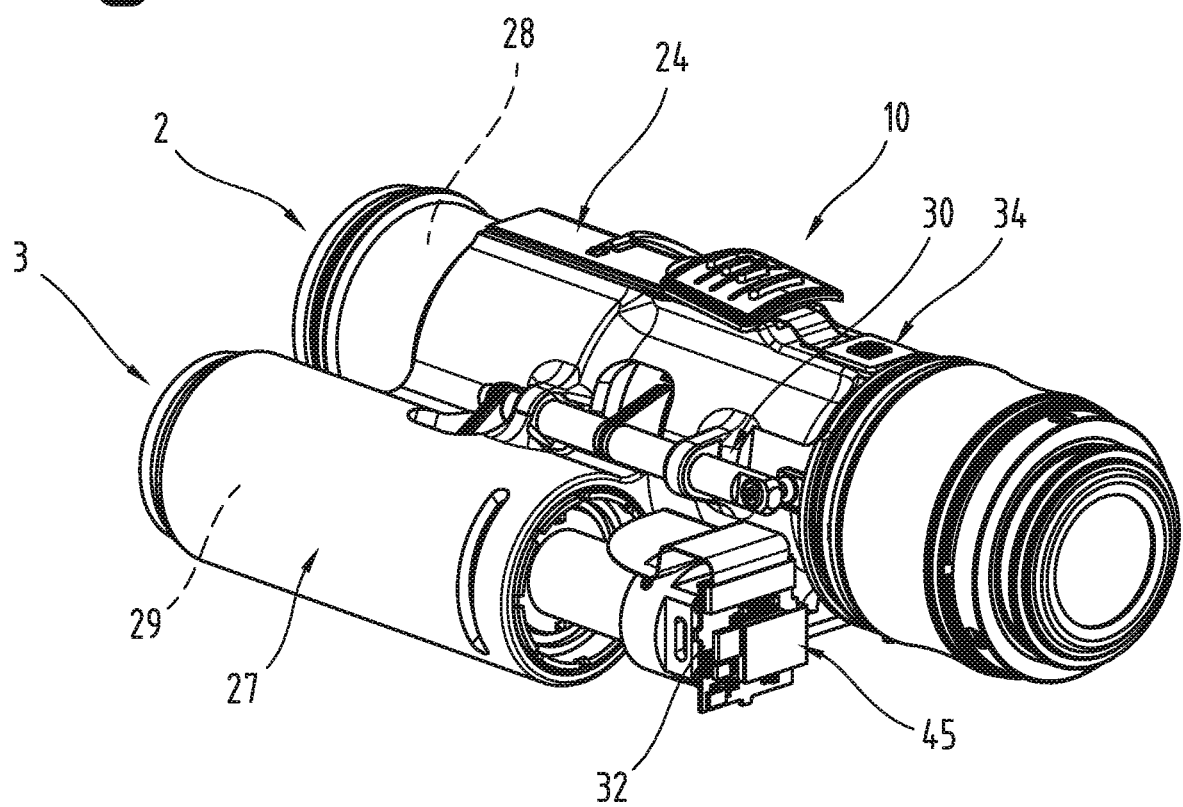

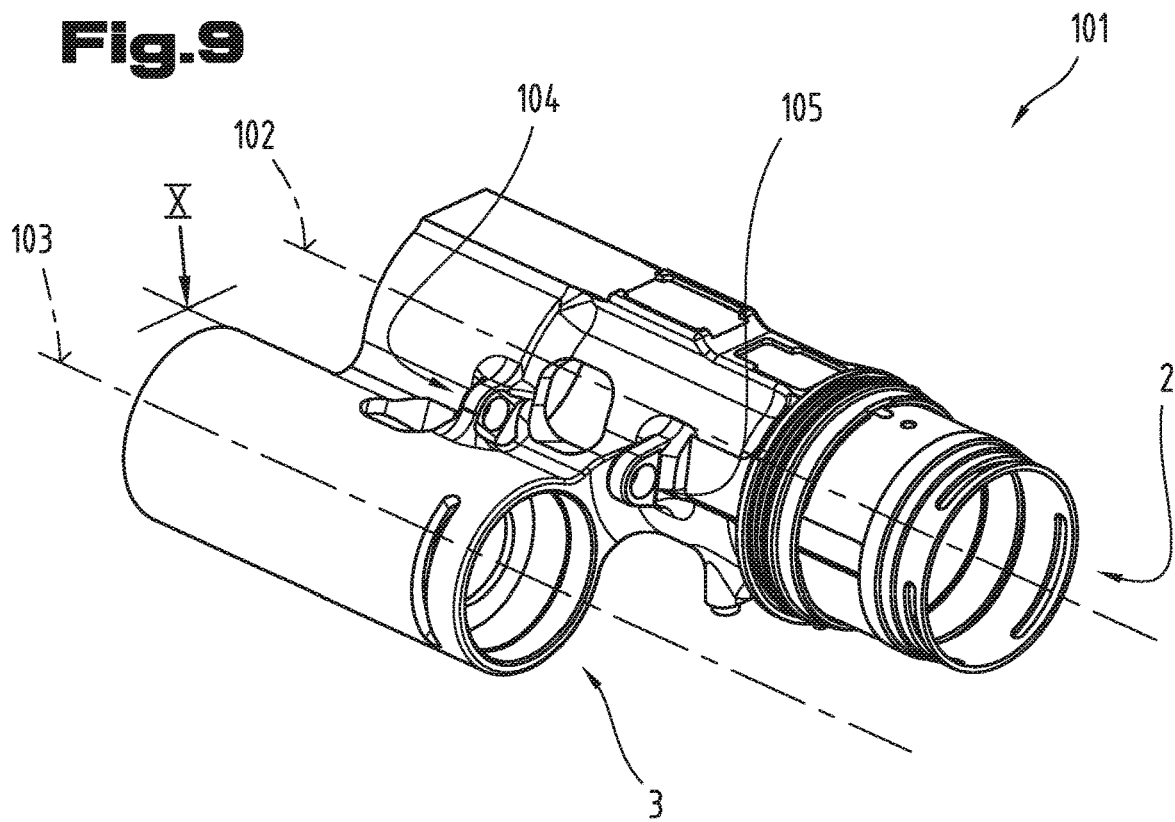
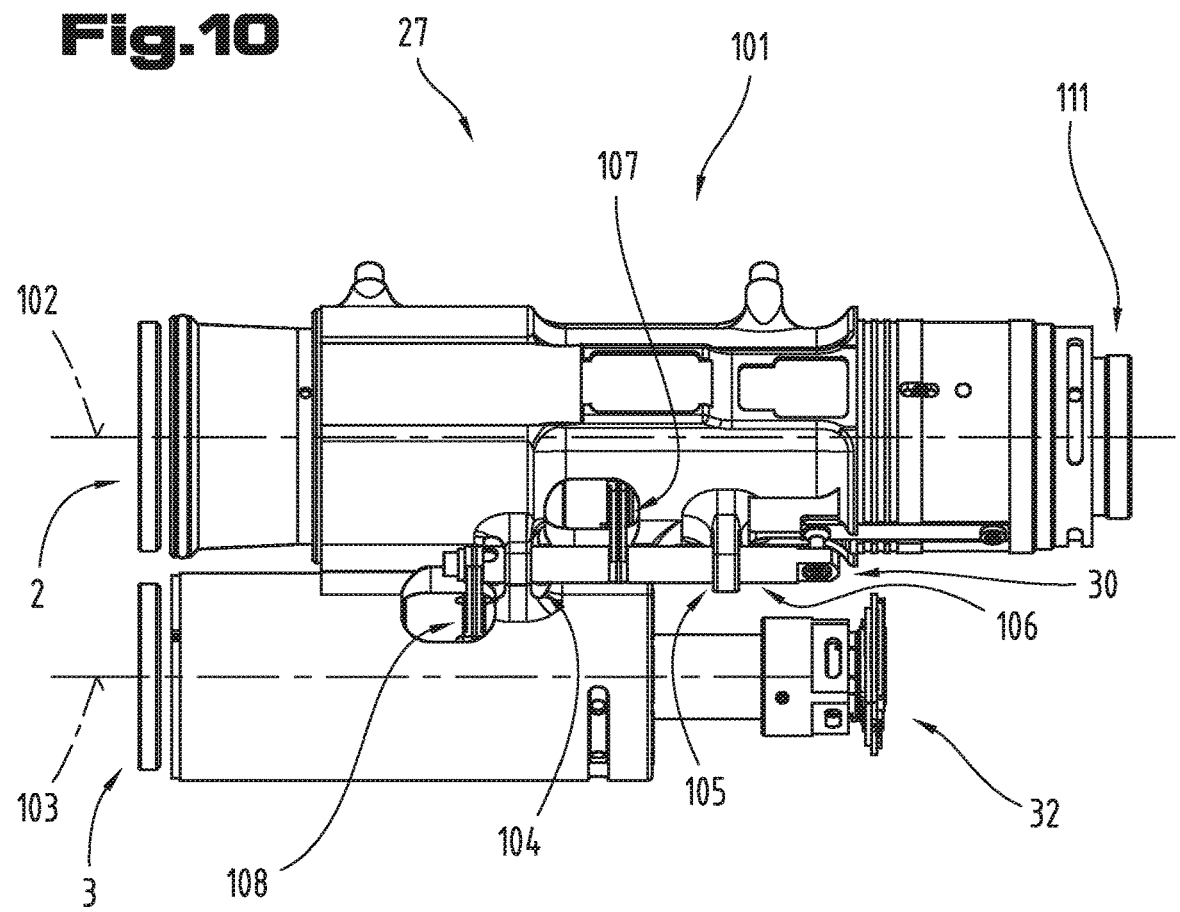

LONG-RANGE OPTICAL DEVICE WITH IMAGE CAPTURING CHANNEL

CROSS REFERENCE TO RELATED APPLICATION

The present application claims priority from Austrian Patent Application No. A 50657/2019 filed Jul. 19, 2019, the disclosure of which is hereby incorporated herein by reference.

BACKGROUND

The invention relates to a long-range optical device, an observation and image capturing system and a method for the retrieval of parameters and/or the execution of functions with an observation and image capturing system.

BRIEF SUMMARY

It was the object of the present invention to overcome the disadvantages of the prior art and to provide a device and a method, by means of which a user is capable of carrying out simple, comfortable operation of a long-range optical device and by means of which images of distant objects can be produced with an image quality that is as high as possible.

This object is achieved by means of a device and a method according to the claims.

The invention relates to a long-range optical device comprising at least one sight channel and an image capturing channel with a camera module, wherein the sight channel and the image capturing channel are coupled to one another by means of an adjusting mechanism such that a first image detail observed in the sight channel essentially corresponds to a second image detail captured by the camera module, at least one interface module for establishing a connection with an electronic terminal, a processing unit, at least one memory unit, wherein the memory unit is formed for storing parameters and/or functions, wherein an electronic operating button is provided for retrieving a preselected parameter and executing a function.

By the combination of a sight channel and an image capturing channel in just one long-range optical device, the operator or a user is able to observe distant objects without optical loss and, if desired, to simply record a digital image, an image sequence or a video of the viewed image detail. In place of a long-range optical observation device and a separate image capturing device, now two devices and/or functions are combined in one long-range optical device according to the invention, said device being particularly compact.

Optionally, a second sight channel can be provided so as to be able to see an image with two eyes.

By arrangement of the sight channel and the image capturing channel above one another, the long-range optical device can be gripped and/or operated with both the left and the right hand of the operator in like manner.

When a digital image, an image sequence and/or a video of an image detail observed through the long-range optical device is captured, it is transmitted to the electronic terminal via the connection essentially in real time and/or with a low latency. In the memory unit of the long-range optical device, images, image sequences and/or videos only have to be buffered for a short time. Therefore, the memory unit merely has to provide a small memory space. The long-range optical device according to the invention can thus still be designed simply and in a compact manner.

In the alternative to this, if there is no active connection with an electronic terminal, a digital image, an image sequence and/or a video can also be buffered in the memory unit of the long-range optical device. Later, as soon as there is an active connection again, a digital image, an image sequence and/or a video can be forwarded to the electronic terminal and be shown, evaluated and/or stored there.

Advantageously, the long-range optical device according to the invention is coupled to an electronic terminal. The electronic components and/or parts provided in the long-range optical device can hence be designed in a very simple manner, since all logic is provided on the electronic terminal. The electronic terminal can be a smartphone, a tablet computer, a portable computer, a desktop PC or a server installation. Since the long-range optical device merely comprises a very small number of electronic components and/or parts, the energy consumption is also relatively low.

The electronic operating button is a simple mechanical button with an actuating contact. In this regard, the actuating contact can be designed as a normally open contact, wherein a preselected parameter is called up and/or a function is executed when the operating button is actuated. A function can be switching on the long-range optical device, switching off the long-range optical device, coupling the long-range optical device to the electronic terminal, capturing an image by means of the image capturing channel, capturing a video by means of the image capturing channel, starting an object recognition, object detection, object classification, and so on. In this regard, the functions are called up in each case via a predefined actuation of the electronic operating button, for example by actuation for a certain period of time or by multiple defined subsequent actuations. A parameter can be a trigger pressure or a trigger time for capturing an image, an image sequence or a video, which are defined and/or stored for a specific operator.

In an embodiment not shown in further detail, it is also conceivable that the electronic operating button is designed as a button, rotary knob or as a touch control panel.

Moreover, it can be useful if a single electronic operating button is provided for executing a plurality of items from the group of parameters and functions.

An operator is provided with an operating possibility for the long-range optical device that is particularly easy and intuitive by means of just one single electronic operating button. By varyingly long actuations of the operating button, the operator can call up and/or execute diverse parameters and functions. In the alternative, a sequence of defined actuations can be provided to call up certain parameters or to execute a function.

Moreover, only a single electronic operating button allows a compact and cost-effective design of the long-range optical device according to the invention, since mechanical and electronic components only have to be provided for one operating button.

Furthermore, it can be provided that the operating button is designed to be essentially elliptical and/or symmetrical to the central axis of the housing. The operating button can thus be ergonomically designed such that it can be easily actuated by the operator.

In addition to this, it can be provided that the operating button is designed to be essentially flush with a surface of a housing of the long-range optical device. Hence, the housing can be designed to be compact and ergonomically shaped.

An embodiment, according to which it can be provided that the operating button comprises a recess, wherein the recess is formed as an orientation aid for at least one finger of a hand of an operator, is also advantageous.

The operator is hence enabled to quickly and easily find the operating button while simultaneously observing and object and/or an image detail through the long-range optical device.

According to a further development, it is possible that a display unit is arranged on the housing, by means of which display unit calling up a parameter and/or executing a function can be visualized.

The operator can hence directly receive a visual feedback on whether and which parameter is called up and on whether and which function is executed. Furthermore, a visual feedback is conceivable here, which signals the faulty execution or the termination of a function.

It can moreover be useful if the display unit comprises at least one lighting unit variable in color.

Hence, a different visualization of different parameters and/or functions can be achieved. The operator can thus easily differentiate which parameter is called up and/or which function is executed. This would further allow for visualization by means of the lighting unit in darkness. The lighting unit can comprise one or multiple LEDs allowing for energy-efficient lighting.

Moreover, it can be provided that at least one display segment that can be lighted is provided on the housing, by means of which display segment a charging state of an energy storage of the long-range optical device can be shown.

Advantageously, by means of lighting individual and/or different display segments of the display unit, multiple different visualizing and signaling possibilities can be created, wherein different parameters and/or functions can be shown each in a different manner. The display unit can hence be designed in a particularly compact and clear manner.

Moreover, it can be provided that an acoustic output unit is provided, by means of which the retrieval of a parameter and/or the execution of a function can be signaled.

In addition to the optical signaling, it can be advantageous to also provide acoustic signaling. While the operator is observing an object through the long-range optical device or is capturing an image, an image sequence or a video, or an object classification is carried out together with an external device. Hence, the acoustic output unit can be used for simple signaling, for example, the start of an image capturing or the completion of a classification. The operator therefore does not have to remove their view from a scene viewed through the sight channel.

According to a particular embodiment, it is possible that the operating button is formed as an eye cup, wherein the eye cup is arranged on the sight channel on the side of the eyepiece.

To further provide a compact and simple long-range optical device, the eye cup can be formed as an operating button. When the eye cup is pressed, the actuating contact for retrieval of a parameter or for executing a function can be actuated. Changing the operator's grip to a separately arranged operating button in the course of observing a scene and/or an object can be dispensed with in this regard, which further increases operating comfort.

It can also be advantageous to control the long-range optical device via an integrated microphone by means of voice commands (acoustic input device) or to support bird recognition by recording and subsequently analyzing bird song.

According to an advantageous further embodiment, it can be provided that the connection is designed as a wireless connection.

The wireless connection can be designed as a WLAN, Bluetooth or NFC connection. Hence, potential wiring effort of the long-range optical device with a mobile terminal is dispensed with, whereby the operating comfort for the operator can be further improved.

In particular, it can be advantageous if the electronic terminal is designed as a smartphone, which can be coupled to the long-range optical device by means of the wireless connection.

Captured images, image sequences and/or videos can be easily viewed on the displays provided as standard on smartphones. The technologies for establishing a wireless connection provided in smartphones as standard can further be used for the transmission of the images, image sequences and/or videos. Additional hardware, besides the long-range optical device and the smartphone, is thus not required, which also enables a compact design of the overall system.

It can further be provided that the operating button comprises a first measuring device for determining an actuating period, wherein in case of a first actuating period, a first function can be executed and in case of a second actuating period differing from the first actuating period, a second function differing from the first function can be executed.

In this regard, for example, the time during which an actuating contact for the operating button is closed can be measured.

Moreover, it can be provided that the operating button comprises a second measuring device for determining a time interval between the actuations of the operating button, wherein in case of a first actuating period, at least one first time interval and at least one second actuating period, a first function can be executed and in case of a third actuating period, at least one second time interval and at least one fourth actuating period, a second function differing from the first function can be executed.

Between the individual actuations, the operating button is not actuated meaning that the actuating contact is open.

An embodiment, according to which it can be provided that the operating button comprises a third measuring device for determining an actuating force, wherein in case of a first actuating force, a first function can be executed and in case of a second actuating force differing from the first actuating force, a second function differing from the first function can be executed, is also advantageous.

The third measuring device may be a force transducer and/or force sensor by means of which the actuating force is measured.

According to a further embodiment, it is possible that the first measuring device and/or the second measuring device and/or the third measuring device are coupled to the processing unit, wherein based on the determined actuating period, the determined time interval and/or the determined actuating force, parameters can be called up and/or functions can be executed.

It can further be useful if a support unit is formed, in which support unit at least one first housing of the sight channel, a second housing of the image capturing channel, the adjusting mechanism, the interface module and the processing unit are arranged.

Advantageously, in the course of assembly, optical, mechanical and electronic components are pre-installed on the support unit and then, in the course of final assembling, the housing is simply slid on and/or slid together with individual housing parts.

Moreover, it can be provided that a first heat dissipation device is formed between the support unit and the processing unit and/or that a second heat dissipation device is formed between the support unit and the first housing of the sight channel and/or that a third heat dissipation device is formed between the housing of the long-range optical device and the camera module.

During longer lasting operation of the long-range optical device, increased heat release from the processing unit or the image capturing device can occur. For heat dissipation, preferably multiple heat dissipation devices are provided on the support unit and/or the housing for dissipating the heat. For an improved heat dissipation, the support units can be made of aluminum and the heat dissipation devices can be made of copper.

The invention further relates to an observation and image capturing system comprising a long-range optical device and an electronic terminal, wherein the long-range optical device and the electronic terminal are coupled to one another via a connection at least temporarily.

According to a particular embodiment, it is possible that the electronic terminal comprises a display device, on which display device an image and/or an image sequence captured by means of a camera module of the long-range optical device can be displayed.

According to an advantageous further embodiment, it can be provided that the electronic terminal comprises a GPS receiver, wherein the location of the long-range optical device can be determined.

Hence, standard components and/or standard functions of the electronic terminal can still be used. In this regard, the long-range optical device can be produced and/or designed in a simple, compact and cost-effective manner.

For establishing a connection such as a WLAN, Bluetooth or NFC connection, a long-range optical device and an electronic terminal must be located in a certain spatial proximity to one another, whereby the location of the electronic terminal can be determined relatively exactly.

It can be advantageous to determine the horizontal alignment of the device to the magnet North Pole by means of a compass integrated in the long-range optical device. The compass can also be used to detect an observation phase towards a distant and stationary object (device at rest).

In particular, it can be advantageous if an application software is installed on a server device, which application software can be accessed by means of the electronic terminal and/or which application software can be executed by means of the electronic terminal.

The application software can also be designed as a mobile application and be installed directly on the mobile terminal. The server device can also be provided in the mobile terminal in this regard. A further advantage of this is that the observation and image capturing system can be designed to be particularly compact.

It can further be provided that the server device comprises a memory system, in which an image and/or an image sequence captured by means of the camera module of the long-range optical device can be stored.

Hence, it is possible that directly on the long-range optical device only a small memory space is provided by an external memory system for storing, filing, analyzing and/or classifying images, image sequences or videos being used. The memory system can also be a memory system which is directly provided in the electronic terminal.

Moreover, it can be provided that parameters and/or functions can be created and/or edited by means of the application software on the electronic terminal, wherein parameters and/or functions can be transmitted from the electronic terminal to the long-range optical device and vice versa via the connection.

In this regard, parameters and/or functions can be simply created or edited by means of the user interface of the mobile terminal and be transmitted back to the long-range optical device. The long-range optical device itself can still be simple with regard to the electronic components and parts and can have a compact structure.

An embodiment according to which it can be provided that the electronic terminal is designed as a smartphone is also advantageous.

The invention further relates to a method for the retrieval of parameters and/or the execution of functions with an observation and image capturing system, wherein the retrieval of a preselected parameter and/or the execution of a function is carried out by actuation of an electronic operating button of a long-range optical device.

In this regard, the retrieval of parameters and/or the execution of functions can be carried out by the operation as easily and intuitively as possible.

Moreover, it can be useful if by a predetermined actuation of a single electronic operating button of the long-range optical device, the selection of a plurality of items from the group of parameters and functions is carried out.

By varyingly long actuations of the operating button, the operator can call up and/or execute diverse parameters and functions.

Moreover, it can be provided that the operational readiness of the long-range optical device is signaled by means of lighting of a display unit of the long-range optical device in a first color.

In this regard, the operator advantageously received an immediate feedback that the long-range optical device is switched on and ready to capture an image, an image sequence and/or a video.

Moreover, it can be provided that the selection of a plurality of items from the group of parameters and functions is carried out based on a determined actuating period and/or a determined time interval and/or a determined actuating force.

In this regard, different actuating periods, time intervals and/or actuating forces can be stored for different parameters and functions. Hence, just one operating button allows for easy and intuitive operation by the operator.

Moreover, it can be useful if in case of a first determined actuating period, a coupling operation of the long-range optical device to an electronic terminal is carried out.

For this purpose, an interface module is provided in the long-range optical device by means of which interface module a WLAN, Bluetooth or NFC connection with the electronic terminal can be established. The standard interfaces provided in the electronic terminal are used for this purpose.

It can further be provided that the coupling operation is visualized by means of lighting of the display unit in a second color, wherein the lighting of the display unit in the second color is flashing during the coupling operation and the lighting of the display unit in the second color is continuous for a predefined period of time after the successful coupling operation.

The operator receives an immediate feedback on the status of the coupling operation and on whether it has been completed successfully.

Moreover, it can be provided that a failed coupling operation is signaled by means of lighting the display unit in a third color.

An embodiment, according to which it can be provided that a charging state of an energy storage of the long-range optical device is visualized by means of lighting the display unit in a fourth color, is also advantageous.

The operator can be continuously informed about the charging state of the energy storage and initiate a charging operation in good time, if for example a longer use of the long-range optical device is planned.

According to a further embodiment, it is possible that the charging state of the energy storage is visualized by means of at least one display segment that can be lighted.

Advantageously, the charging state of the energy storage can also be seen and/or visualized well in darkness.

It can further be useful if the charging state of the energy storage is visualized by means of combined lighting of the display unit and at least one display segment.

Moreover, it can be provided that the operational readiness of the long-range optical device is signaled by means of an acoustic output unit.

In addition to the optical signaling, it can be advantageous to also provide acoustic signaling. While the operator is observing an object through the long-range optical device or is capturing an image, an image sequence or a video, hence, easy signaling, for example of the start of image capturing, can be carried out by means of the acoustic output unit. The operator therefore does not have to remove their view from a scene viewed through the sight channel A simplification of the operation can further be achieved by an acoustic input unit via an integrated microphone.

Moreover, it can be provided that a wireless connection of the long-range optical device to an electronic terminal is established, wherein parameters and/or functions are transmitted from the electronic terminal to the long-range optical device and vice versa.

According to a particular embodiment, it is possible that parameters and/or functions are transmitted from an electronic terminal to a plurality of long-range optical devices and vice versa.

A plurality of operators can hence be provided with the same parameters and functions.

According to an advantageous embodiment, it can be provided that functions selected from the group comprising switching on the long-range optical device, switching off the long-range optical device, coupling the long-range optical device to the electronic terminal, capturing an image by means of the image capturing channel, capturing a video by means of the image capturing channel by actuating the operating button are carried out.

Depending on the purpose of use and requirements by the operator, further functions are conceivable, wherein these can be easily created on the electronic terminal and transmitted to a coupled long-range optical device.

In particular, it can be advantageous if the selection of a plurality of items from the group of parameters and functions takes place immediately one after the other.

It may also be provided that the program flow of a plurality of selected functions is carried out largely in parallel. Advantageously, the speed of the individual program flows can hence be increased.

Moreover, it can be provided that the program flow of a plurality of selected functions is carried out so as to be displaced in time.

An embodiment, according to which it can be provided that the program flow is carried out by means of an application software of the coupled electronic terminal is also advantageous.

Advantageously, the flow of the entire program logic happens on the electronic terminal, whereby the long-range optical device can be designed as easy and compact as possible.

According to a further embodiment, it is possible that parameters and/or functions are created and/or edited by means of the application software on the electronic terminal, wherein parameters and/or functions are transmitted from the electronic terminal to the long-range optical device and vice versa via the wireless connection.

It can further be useful if by a predefined actuation of the operating button, an image and/or an image sequence is captured, which are shown on a display device of the electronic terminal.

The long-range optical device can hence still be designed to be simple and compact and the standard components of the electronic terminal can be used for image representation.

According to a particular embodiment, it is possible that in case of the predefined actuation of the operating button at the beginning of capturing the image and/or the image sequence, an acoustic signal is output by means of the acoustic output unit.

The operator can hence receive an immediate feedback on capturing having been started without having to remove their view from an observed object and/or an image detail.

Moreover, it can be provided that a captured image and/or a captured image sequence are stored in a memory system of a server device.

In this regard, the server device can have a direct wireless connection to the long-range optical device or be coupled to the electronic terminal. Thus, the long-range optical device merely has to have a small integrated memory capacity and can still be designed to be compact and simple.

Moreover, it can be provided that the location of the long-range optical device is determined by means of a GPS receiver of the electronic terminal.

The object of the invention is also achieved by a long-range optical device having at least one sight channel and having an image capturing channel, wherein the image capturing channel comprises a camera module for electronically capturing images, and wherein in the sight channel, a first beam path is formed by a first objective, a first focusing lens, an erecting system and a first eyepiece, and wherein in the image capturing channel, a second beam path is formed by a second objective, a second focusing lens and a second eyepiece, and wherein the first focusing lens and the second focusing lens are displaceable together by means of a first focusing unit, wherein in the first beam path of the sight channel, a reference image plane is determined by a reticle or by an image reproduced by projection optics, and wherein the first eyepiece of the sight channel is displaceable by means of a second focusing unit for focusing on the reference image plane.

Advantageously, in the long-range optical device the first focusing unit comprises a focusing ring and an adjusting mechanism, which is coupled to the focusing ring, for displacing the first focusing lens and the second focusing lens in parallel to optical axes of the first and the second beam paths.

It is further provided that the second focusing unit comprises a diopter ring for displacing the eyepiece lenses in parallel to the optical axis of the first beam path.

According to a further formation of the long-range optical device, the camera module comprises a third focusing unit.

It is also advantageous for the camera module to comprise an electronic image capturing sensor and for the third focusing unit to comprise an autofocus unit. This makes it possible to achieve focusing on the camera's image sensor with consistently high quality that would not be possible on the basis of subjective assessment of the image sharpness perceived by an operator alone.

It can further be useful that the second beam path of the image capturing channel comprises an afocal lens system.

The formation of the long-range optical device, according to which the first focusing lens of the sight channel is arranged on a side of the reference image plane facing away from the first eyepiece, has the advantage that thereby focusing of the eyepiece lenses on the reticle and focusing of the image of the distant object on the reference image plane can be carried out independently.

By the further formation, in which the long-range optical device is formed having two sight channels, it is possible to enable the operator to comfortably observe with both eyes.

The object of the invention is also achieved by a method for observing a distant object with a long-range optical device in a formation as described above, wherein an operator, while looking through the sight channel, subjectively focuses the first eyepiece of the sight channel to the reference image plane by means of the second focusing unit, and subsequently, while aiming at the distant object, an image of the distant object is focused by means of the first focusing unit, and subsequently an image of the distant object is automatically focused in the image capturing channel by means of the third focusing unit of the camera module.

The approach in which a processing unit detects the completion of movement of the focusing lens and subsequently the processing unit automatically triggers the focusing of the image of the distant object in the image capturing channel, is advantageous.

In an alternative measure it is provided that when an electronic operating button is actuated by the operator, focusing of the image of the distant object in the image capturing channel is triggered.

It is also advantageous if a wireless connection of the long-range optical device to an electronic terminal is established and the image of the distant object is displayed on a display device by the electronic terminal, and when the operator selects an image detail of the image of the distant object on the electronic terminal, the autofocus function of the camera module is automatically controlled to focus on the selected image detail. This has the advantage that, hence, focusing on different details and/or objects at different distances in the scene can be carried out on the electronic terminal without manual actions for focusing having to be carried out on the long-range optical device itself.

For the purpose of better understanding of the invention, it will be elucidated in more detail by means of the figures below.

BRIEF DESCRIPTION OF THE DRAWINGS

These show in a respectively very simplified schematic representation:

FIG. 1 a perspective view of a long-range optical device;

FIG. 2 a side view of the long-range optical device;

FIG. 8 a second perspective view of the support unit of the long-range optical device;

FIG. 9 the support frame of the support unit of the long-range optical device, shown in a perspective view;

FIG. 10 a top view onto the support unit, depicted with the optical components;

DETAILED DESCRIPTION

Figure 3:
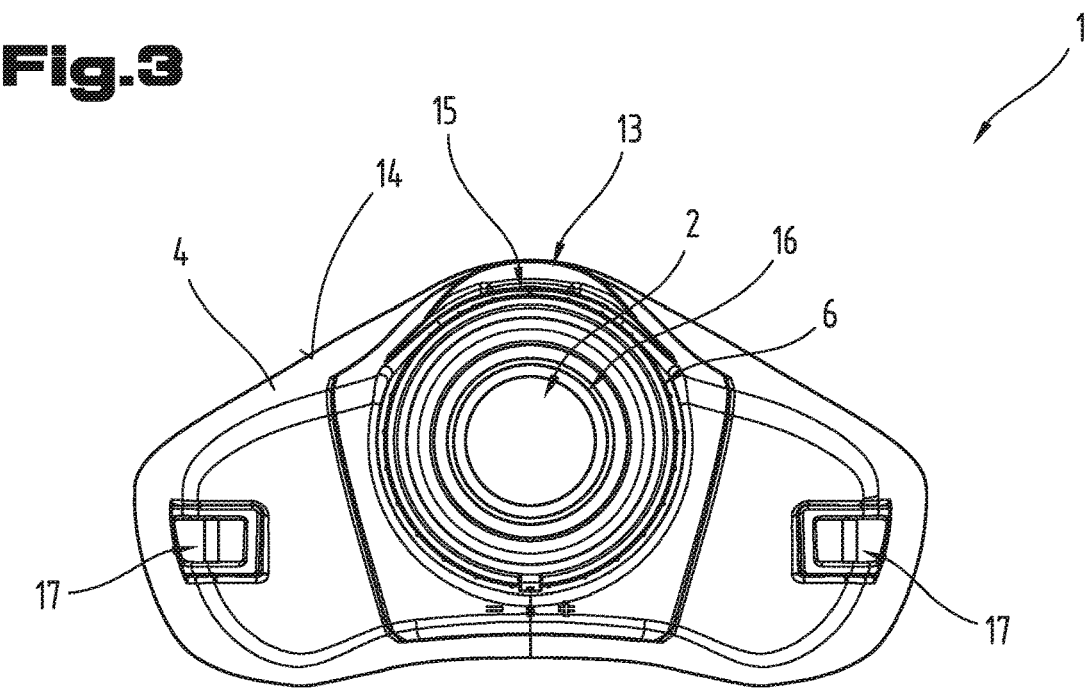
FIG. 3 an eyepiece-side view of the long-range optical device.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a perspective view of a long-range optical device 1. The long-range optical device 1 comprises a sight channel 2 and an image capturing channel 3, which are accommodated in a housing 4. The long-range optical device 1 further comprises a focusing ring 5 for focusing an image and/or image detail viewed through the long-range optical device 1, a diopter ring 6 for setting a dioptric correction, a display unit 7 and multiple display segments 8 that can be lighted for representing a charging state of an energy storage 9 of the long-range optical device 1. By means of a lighting unit 10 that can be changed in color, the display unit 7 can be lighted in different colors, wherein different operating states of the long-range optical device 1 and/or the retrieval of a parameter and/or the execution of a function can be visualized.

For example, the operational readiness and/or switching on the long-range optical device 1 is signaled by lighting of the display unit 7 in a first color. Here, the selection of a plurality of items from the group of parameters and functions can be carried out based on a determined actuating period and/or a determined time interval and/or a determined actuating force.

For example, in case of a first determined actuating period, a coupling operation of the long-range optical device 1 to an electronic terminal 11 can be carried out. In this regard, the coupling operation can be visualized by lighting of the display unit 7 in a second color, wherein the lighting of the display unit 7 in the second color is flashing during the coupling operation and the lighting of the display unit 7 in the second color is continuous for a predefined period of time after the successful coupling operation. Moreover, a failed coupling operation can be signaled by lighting of the display unit 7 in a third color.

In the alternative or in addition to the representation of the charging state of the energy storage 9 by means of the display segment 8 that can be lighted, the charging state of the energy storage 9 can also be visualized by lighting of the display unit 7 in a fourth color.

Furthermore, an acoustic output unit 12, which can also serve to signal the retrieval of a parameter and/or the execution of a function, is provided on the long-range optical device 1. For example, a first signal tone can be output by means of the output unit 12 after the long-range optical device 1 has been switched on. Moreover, it is conceivable that a second signal tone is output when a coupling operation with an electronic terminal 11 was successful and/or a third signal tone is output when a coupling operation with an electronic terminal 11 was not successful.

An electronic operating button 13 is provided for execution a plurality of items from the group of parameters and functions. In the represented exemplary embodiment, the operating button 13 is designed to be essentially elliptical, wherein any geometric shape, such as round, rectangular, etc. is conceivable as the shape for the operating button.

FIG. 2 shows a further and possibly independent embodiment of the long-range optical device 1, wherein again, equal reference numbers/component designations are used for equal parts as before in FIG. 1. In order to avoid unnecessary repetitions, it is pointed to/reference is made to the detailed description in FIG. 1 preceding it.

FIG. 2 shows a side view of the long-range optical device 1, wherein the operating button 13 is essentially flush with a surface 14 of the housing 4 of the long-range optical device 1. The operating button 13 further comprises a recess 15, wherein the recess 15 is formed as an orientation aid for at least one finger of a hand of an operator.

The long-range optical device 1 further comprises an eye cup 16, through which the operator of the long-range optical device 1 can observe an image and/or an image detail, on the eyepiece side of the sight channel 2. Here, according to an exemplary embodiment not shown in further detail, it is conceivable that the operating button 13 is designed as the eye cup 16, wherein the eye cup 16 can be used to execute a plurality of items from the group of parameters and functions.

In this regard, the eye cup 16 is designed so as to be displaceable in the longitudinal direction along the central axis of the sight channel 2 to allow individual adjustment to an operator, who may be a wearer of glasses.

FIG. 3 shows a further and possibly independent embodiment of the long-range optical device 1, wherein again, equal reference numbers/component designations are used for equal parts as before in FIGS. 1 and 2. In order to avoid unnecessary repetitions, it is pointed to/reference is made to the detailed description in FIGS. 1 and 2 preceding it.

FIG. 3 shows an eyepiece-side view of the long-range optical device 1, wherein cylindrical pins 17 are provided for holding a carrying strap not shown in further detail.

Figure 4:
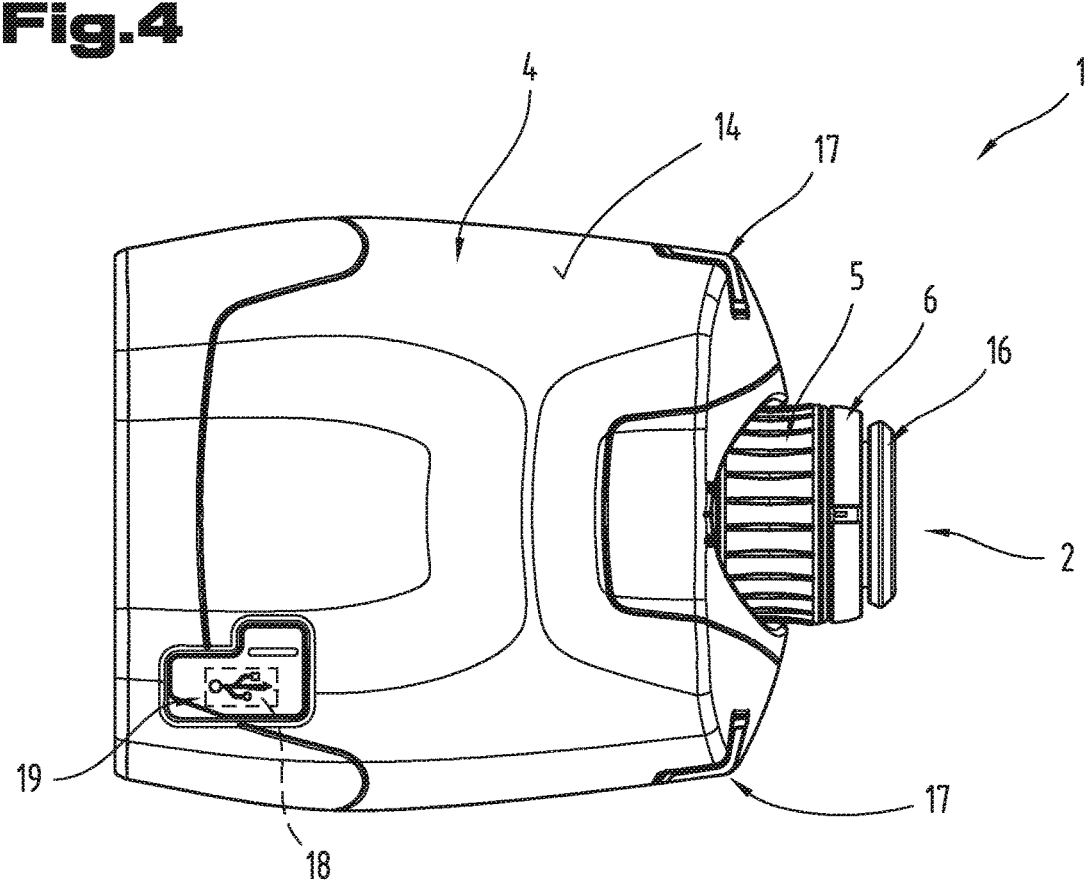
FIG. 4 a bottom side of the long-range optical device.

FIG. 4 shows a further and possibly independent embodiment of the long-range optical device 1, wherein again, equal reference numbers/component designations are used for equal parts as before in FIGS. 1 to 3. In order to avoid unnecessary repetitions, it is pointed to/reference is made to the detailed description in FIGS. 1 to 3 above.

FIG. 4 shows a bottom side of the long-range optical device 1, wherein a socket 18 for a plug connector not shown in further detail of a connecting and/or charging cable is closed with a cover 19. After removing or opening the cover, the plug connector of a connection or charging cable can be plugged in, whereupon a connection with an electronic terminal 11 can be established or a charging operation of the energy storage 9 can be started.

Figure 5:
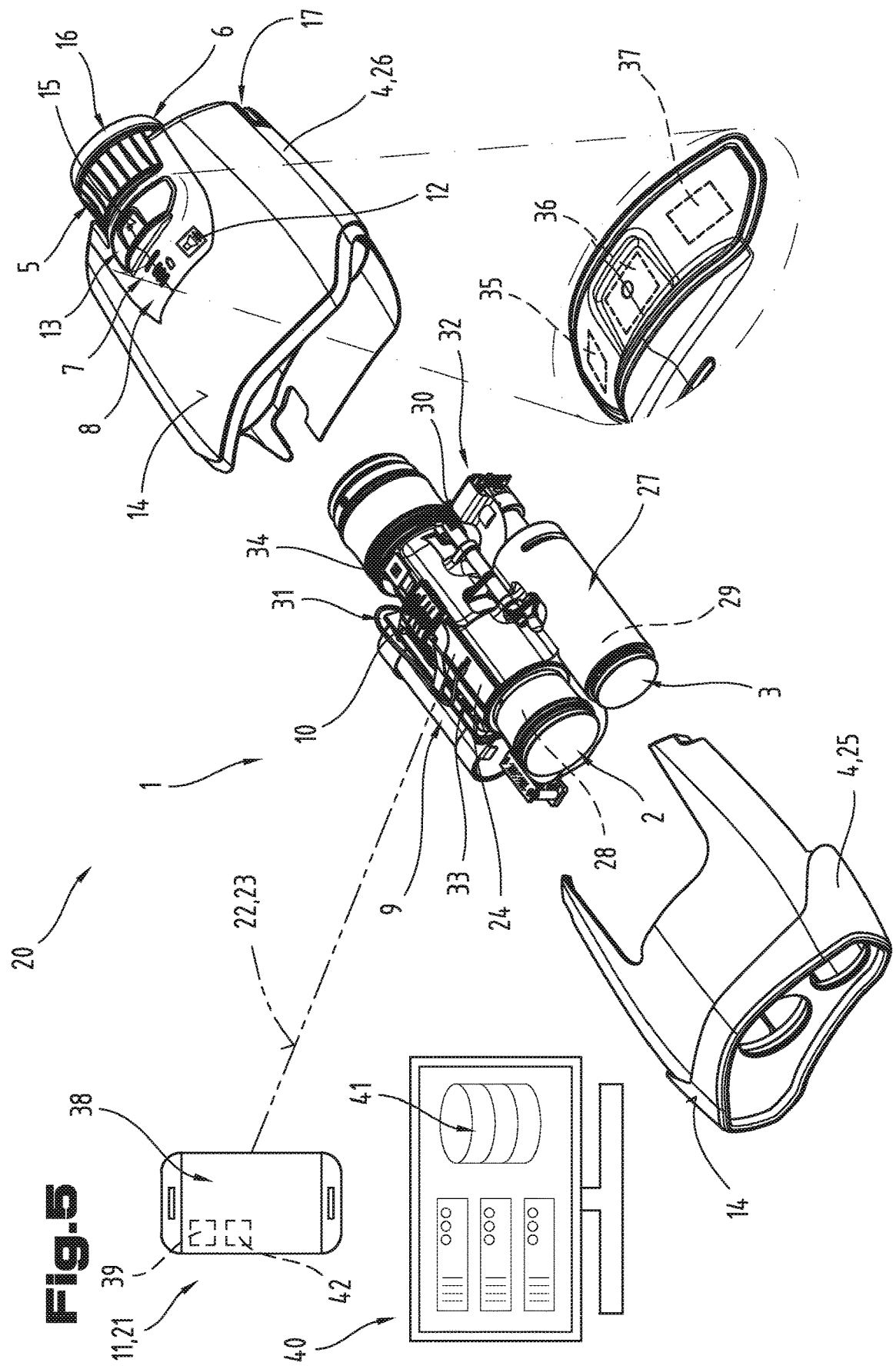
FIG. 5 an observation and image capturing system.

FIG. 5 shows a further and possibly independent embodiment of the observation and image capturing system 20, wherein again, equal reference numbers/component designations are used for equal parts as before in FIGS. 1 to 4. In order to avoid unnecessary repetitions, it is pointed to/reference is made to the detailed description in FIGS. 1 to 4 above.

The observation and image capturing system 20 shown in FIG. 5 comprises a long-range optical device 1 and an electronic terminal 11 in the form of a smartphone 21. The smartphone 21 is coupled to the long-range optical device 1 via a connection 22 in the form of a wireless connection 23. The wireless connection 23 can for example be a Bluetooth, WLAN or an NFC connection. To implement a connection 22 and/or a wireless connection 23 with an electronic terminal 11 and/or a smartphone 21, the long-range optical device 1 comprises an interface module 24. In this regard, the interface module 24 can comprise a WLAN antenna not depicted in further detail.

The long-range optical device 1 is shown in FIG. 5 in an exploded view with a first housing part 25, a second housing part 26 and a support unit 27. A first housing 28 of the sight channel 0, a second housing 29 of the image capturing channel 3, an adjusting mechanism 30, the interface module 24 and a processing unit 31 are arranged in and/or on the support unit 27.

The support unit 27 can be a premounted assembly, which is inserted into the first housing part 25 and the second housing part 26 during final assembly. Hence, simple assembly of the long-range optical device 1 is allowed for. The support unit 27 can be made of aluminum and the housing 4 and/or the first housing part 25 and the second housing part 26 can be made of a plastic material.

Moreover, a camera module 32 is provided on the image capturing channel 3, wherein the sight channel 2 and the image capturing channel 3 are coupled to one another by means of the adjusting mechanism 30 such that a first image detail viewed in the sight channel 2 essentially corresponds to a second image detail captured by the camera module 32. Parameters and/or functions can be stored in the long-range optical device 1 by means of a memory unit 33. Parameters and/or functions can be transmitted from the electronic terminal 11 to the long-range optical device 1 via the wireless connection 23 of the long-range optical device 1 with the electronic terminal 11.

For retrieving a parameter and/or executing a function, an actuation of the single electronic operating button 13 provided on the long-range optical device 1 is carried out, wherein an actuating contact 34 is actuated.

To determine an actuating period the operating button 13 comprises a first measuring device 35, wherein in case of a first actuating period, a first function can be executed and in case of a second actuating period differing from the first actuating period, a second function differing from the first function can be executed.

To determine a time interval between the actuations of the operating button 13, the operating button 13 comprises a second measuring device 36, wherein in case of a first actuating period, at least one first time interval and at least one second actuating period, a first function can be executed and in case of a third actuating period, at least one second time interval and at least one fourth actuating period, a second function differing from the first function can be executed.

To determine an actuating force, the operating button 13 comprises a third measuring device 37, wherein in case of a first actuating force, a first function can be carried out and in case of a second actuating force differing from the first actuating force, a second function differing from the first function can be carried out.

The first measuring device 35, the second measuring device 36 and/or the third measuring device 37 can also be arranged on the actuating contact 34 according to an exemplary embodiment not shown in further detail.

The first measuring device 35, the second measuring device 36 and the third measuring device 37 are coupled to the processing unit 31 in the embodiment shown in FIG. 5, wherein parameters can be called up and/or the functions can be carried out based on the determined actuating period, the determined time interval and/or the determined actuating force.

The electronic terminal 11 coupled to the long-range optical device 1 via the wireless connection 23 comprises a display device 38, such as a screen or a touchscreen. An image and/or video captured by means of the camera module 32 of the long-range optical device 1 can be displayed on the display device 38.

In this regard, recording an image and/or an image sequence can be carried out by a predefined actuation of the operating button 13, for example an actuation of the operating button 13 for an actuating period of 0.5 seconds. An acoustic signal can be output by means of the acoustic output unit 12 when capturing is started.

The location of the long-range optical device 1 can further be determined by means of a GPS receiver 39 provided in the electronic terminal 11.

The observation and image capturing system 20 shown in FIG. 5 further comprises a server device 40 having a memory system 41. In this regard, an application software, which the electronic terminal 11 can access via a second connection and/or wireless connection not shown in further detail, is installed on the server device 40. The application software can be executed by means of the electronic terminal 11. In this respect, parts of the application can be installed on the electronic terminal 11 in the form of a mobile application. Parameters and/or functions can be created or edited on the electronic terminal 11 by means of the application software, wherein parameters and/or functions can be transmitted from the electronic terminal 11 to the long-range optical device 1 and vice versa via the connection 22.

In this regard, parameters and/or functions can be transmitted from an electronic terminal 11 to a plurality of long-range optical devices 1 and vice versa in an embodiment not shown in further detail.

The functions can be switching on the long-range optical device 1, switching off the long-range optical device 1, coupling the long-range optical device 1 to the electronic terminal 11, capturing an image by means of the image capturing channel 3, capturing a image sequence and/or a video by means of the image capturing channel 3, which are executed and/or started by actuating the operating button 13.

The selection of a plurality of items from the group of parameters and functions can take place immediately one after the other. The program flow of a plurality of selected functions can be carried out essentially in parallel or displaced in time. The program flow is carried out by means of the application software of the coupled electronic terminal 11.

An image and/or an image sequence captured by means of the camera module 32 of the long-range optical device 1 can still be stored in the memory system 41.

An application software and/or a mobile application can be a first mobile application which offers the functions live streaming, image administration and implementation of updates for the firmware of the long-range optical device 1. Live streaming is a real-time transmission of an image or a video captured by means of the image capturing channel 3 and/or the camera module 32 to the coupled electronic terminal 11. In this regard, it is also possible that not just one single, but multiple terminals are coupled such that multiple persons can look at the live stream at the same time. In further consequence, images and/or videos can be viewed on the display device 38 of the electronic terminal 11 by an operator. In the course of image administration, transmitted images or videos can be stored in a memory 42 of the electronic terminal 11 or be transmitted to the memory system 41 and be stored there. The memory system 41 can also be a cloud memory in an embodiment not described in further detail.

A second mobile application can be an identification application for birds. The type of bird can be recognized by means of an image database not described in further detail and an image recognition algorithm using an image of a bird captured by means of the image capturing channel 3 and/or the camera module 32, which is transmitted to the electronic terminal 11. Then, the type of the bird can be output on the display device 38 of the electronic terminal 11. In this regard, it is conceivable that additional information such as a description of the type, a bird call and/or a representation of the geographic distribution are output on the mobile terminal 11.

A third mobile application can be an identification application for mountains, wherein the names of the mountain peaks can be output using a captured image of mountains.

It is further conceivable that by means of a fourth mobile application, a captured image or an image sequence and/or a video is share with a second operator, wherein a transmission to a second electronic terminal not shown in further detail is carried out.

Figure 6:
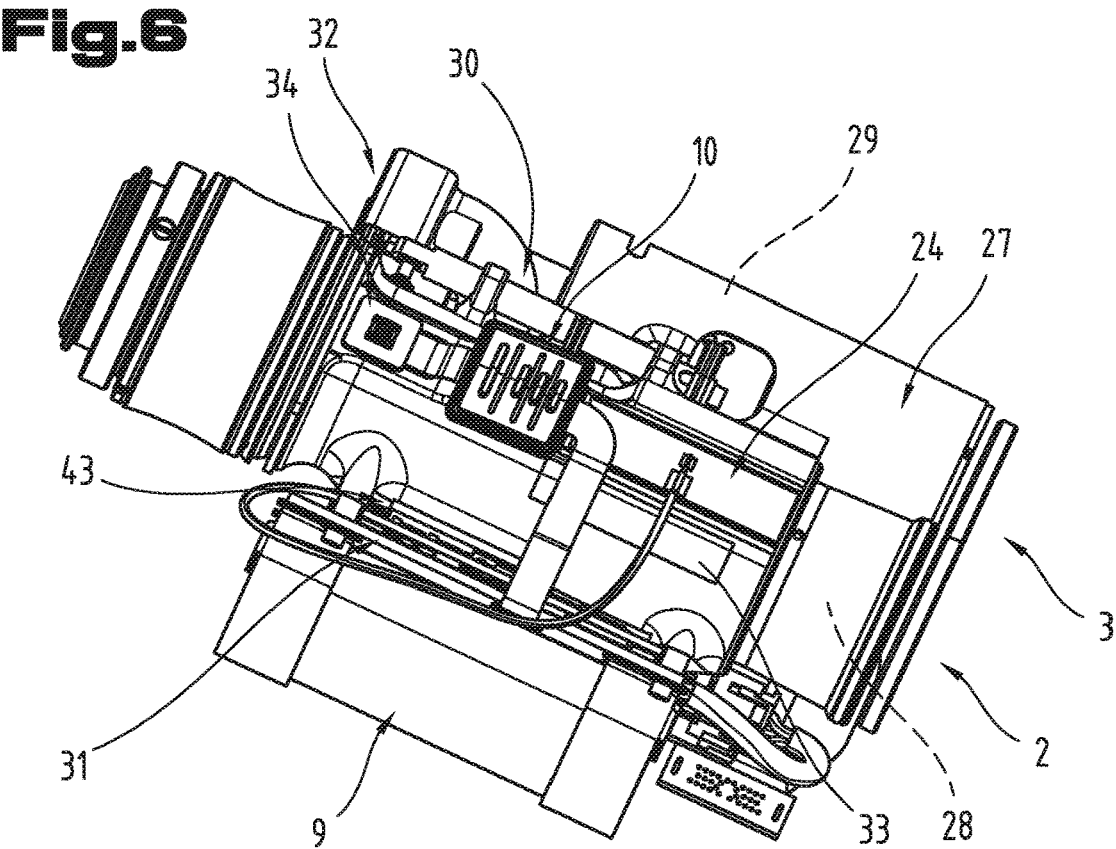
FIG. 6 a first perspective view of a support unit of the long-range optical device.
Figure 7:
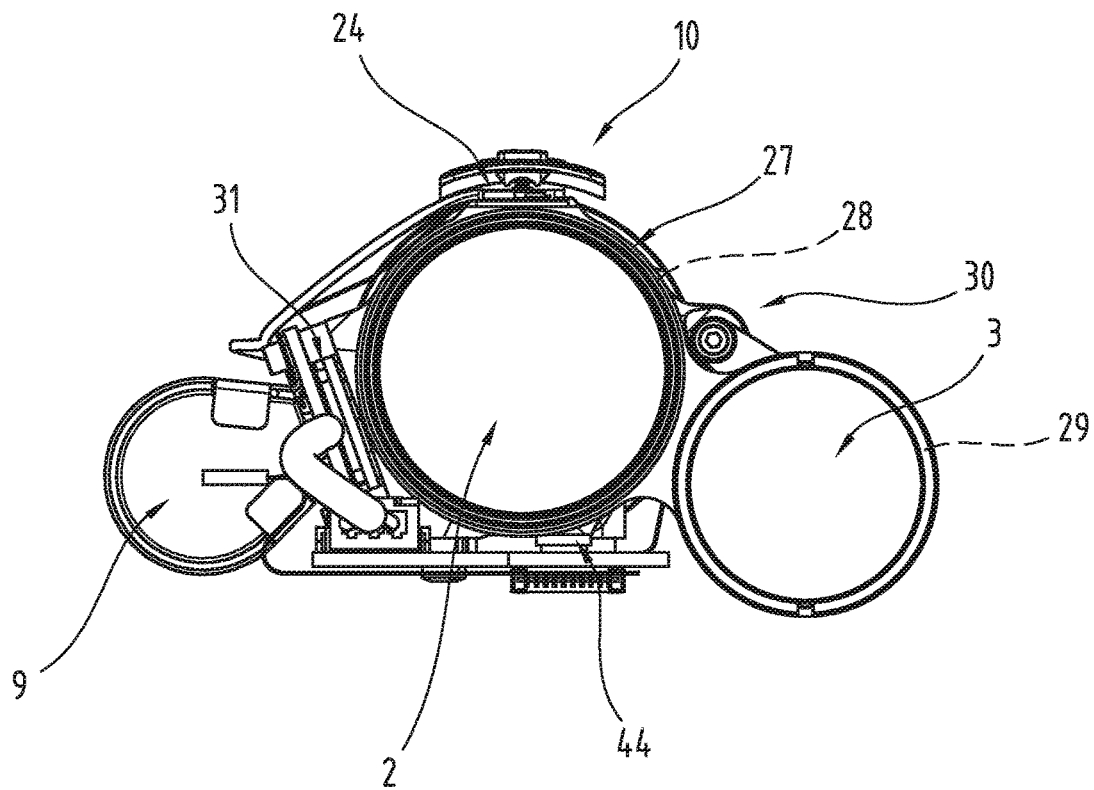
FIG. 7 an objective-side view of the support unit of the long-range optical device.

FIGS. 6 and 7 show a further and possibly independent embodiment of the support unit 27 of the long-range optical device 1, wherein again, equal reference numbers/component designations are used for equal parts as before in FIGS. 1 to 5. In order to avoid unnecessary repetitions, it is pointed to/reference is made to the detailed description in FIGS. 1 to 5 above.

FIG. 6 shows a first perspective view of the support unit 27 of the long-range optical device 1 and FIG. 7 shows an objective-side view of the support unit 27 of the long-range optical device.

For thermal management, a first heat dissipation device 43 is formed between the support unit 27 and the processing unit 31 and a second heat dissipation device 44 is formed between the support unit 27 and the first housing 28 of the sight channel 2. The waste heat of the processing unit 31 and/or of a voltage controller not shown in further detail is transferred to the support unit 27 via the first heat dissipation device 43. For an improved transfer of the waste heat, the support unit 27 can be made of aluminum.

FIG. 8 shows a further and possibly independent embodiment of the support unit 27 of the long-range optical device 1, wherein again, equal reference numbers/component designations are used for equal parts as before in FIGS. 1 to 7. In order to avoid unnecessary repetitions, it is pointed to/reference is made to the detailed description in FIGS. 1 to 7 above.

FIG. 8 shows a second perspective view of the support unit 27 of the long-range optical device 1. For thermal management, moreover, a third heat dissipation device 45 is formed between the housing 4 of the long-range optical device 1 and the camera module 32. In this regard, thermal coupling of the camera module 32 and/or the image capturing channel 3 to the housing 4 can be provided via a heat-conducting plate made of copper.

FIG. 9 shows the support frame 101 of the support unit 27 of the long-range optical device 1 in a perspective view. For reasons of clarity, components and/or assemblies arranged on the support frame 101 for mounting the support unit 27 are not shown (FIG. 5). The sight channel 2 and the image capturing channel 3 are held in two tubular recesses of the support frame 101, which is also indicated by a first optical axis 102 of the sight channel 2 and a second optical axis 103 of the image capturing channel 3. The support frame 101 is preferably designed as a single piece, whereby a more precise and stable alignment of the sight channel 2 and the image capturing channel 3 relative to one another can be ensured. A first and a second bearing bush 104, 105 for holding a push rod 106 of the adjusting mechanism 30 can be seen on the support frame 101 (FIG. 10).

FIG. 10 shows a top view onto the support unit 27, in which the support frame 101 is shown along with optical components of the sight channel 2 and the image capturing channel 3. The representation corresponds to a top view in the direction perpendicularly to a plane containing one of the optical axes 102, 103 of the sight channel 2 and/or the image capturing channel 3. The push rod 106 of the adjusting mechanism 30 is coupled to corresponding displaceable lens mounts of the sight channel 2 and of the image capturing channel 3 by means of a first driver 107 and a second driver 108. Via corresponding control grooves (not shown), the focusing ring 5 (FIG. 1), when actuated, can act on the adjustment mechanism 30 such that the push rod 106 is moved in parallel to the optical axes 102, 103. By coupling to the push rod 106 by means of the drivers 107, 108, lastly, a first focusing lens 109 of the sight channel 2 on the one hand and a second focusing lens 110 of the image capturing channel 3 on the other hand (FIG. 11) are displaced in the axial direction. The focusing ring 5, the push rod 106 and the two drivers 107, 108 hence form a first focusing unit, by means of which the first focusing lens 109 of the sight channel 2 and the second focusing lens 110 of the image capturing channel 3 can be displaced together.

Furthermore, an eyepiece mount 111 of a first eyepiece 112 (a lens system formed of multiple individual lenses) of the sight channel 2 can be seen (FIG. 11) on the observer-side end region of the sight channel 2 of the support frame 101. The eyepiece lens 112 can be displaced in the direction of the optical axis 102 by actuation and/or by rotation of the diopter ring 6 (FIG. 1). Hence, a second focusing unit is formed at the sight channel 2 of the long-range optical device 1.

Figure 11:
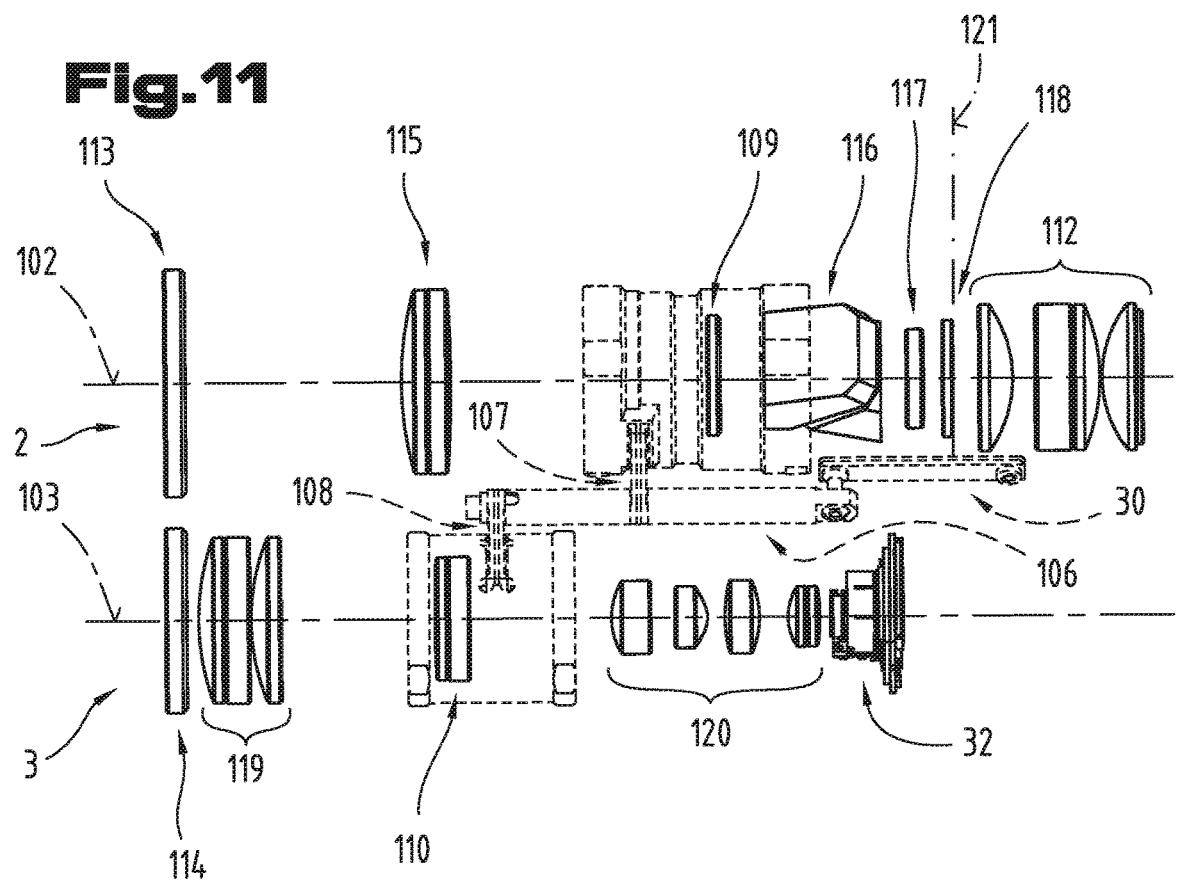
FIG. 11 a cross-section of the two optical systems of the sight channel and the image capturing channel.

FIG. 11 shows the two optical systems of the sight channel 2 and the image capturing channel 3, represented by means of a cross-section according to a sectional plane with the optical axes 102, 103 of the sight channel 2 and/or the image capturing channel 3. For reasons of clarity, the representation of other components than those lenses and/or prisms responsible for the optical imaging has been essentially dispensed with in the representation of the long-range optical device 1 in FIG. 11. Moreover, it should be noted here that where, below, "lenses", such as an eyepiece lens, an objective lens or a focusing lens, are referred to and the term "lens" is used in the singular form, that is not to be understood in a limiting sense, but that, where appropriate, a system of multiple lenses is or may be meant by that term. This is common practice in technical optics to avoid and/or compensate for imaging errors.

A cover glass 113 and/or a cover glass 114 is provided on the objective side on both the sight channel 2 and the image capturing channel 3. Following the cover glass 113, the sight channel 2 comprises an objective lens 115, the focusing lens 109, an erecting system 116 formed by prisms, a field lens 117, a reticle 118 and an eyepiece lens 112. A first beam path for enlarged representation of a distant object is formed by the mentioned optical elements. A second beam path is formed in the image capturing channel 3. Following the cover glass 114, its optical elements are an objective lens 119, the focusing lens 110, an eyepiece lens 120 and the camera module 32. The objective lens 119, the focusing lens 110 and the eyepiece lens 120 of the image capturing channel 3 together form an afocal lens system. The camera module 32 is preferably formed as a unit with an electronic image capturing sensor, a separate objective and with an integrated autofocus function.

In the representation according to FIG. 11, parts of the adjusting mechanism 30, such as the push rod 106 and the two drivers 107, 108 for common displacement of the focusing lens 109 of the sight channel 2 and the focusing lens 110 of the image capturing channel 3 are also shown being indicated in dashed lines. As mentioned above, the eyepiece lens 112 can also be displaced in the direction of the optical axis 102 of the sight channel 2. This allows a user to first focus the eyepiece lens 112 on marks (not shown) on the reticle 118 by actuating the diopter ring 6. The reticle 118 is arranged stationarily in the sight channel 2 in the direction of the optical axis 102. By the spatial arrangement of the marks provided on the reticle 118, hence, a reference image plane 121 is determined.

Moreover, the marks placed on the reticle 118 are arranged such that an image detail captured by the camera module 32 is marked for an operator and/or an observer. Preferably, marks are provided by which the lateral edges of a rectangular image detail or the corners of the image detail are indicated.

Thus, when operating the long-range optical device 1 for observing a distant object, a person will first focus the eyepiece and/or the eyepiece lens 112 to the reference image plane 121 by means of the diopter ring 6 when looking through the sight channel 2. Afterwards—when aligning the long-range optical device 1 with a distant object (and/or when aiming)—an image of the distant object can also be focused by rotating the focusing ring 5. This focusing of the image of the distant object is equivalent to a displacement of an image plane of the image of the distant object, such that it comes to rest in the reference image plane 121 as precisely as possible. Hence, the marks of the reticle 118 and the image of the distant object appear equally sharp to the operator when looking through the eyepiece 112.

With respect to the reference image plane 118, the focusing lens 109 of the sight channel 2 is arranged on a side of the reference image plane 118 facing away from the eyepiece 112. Hence, focusing of the eyepiece lens 112 to the reticle 118 and focusing of the image of the distant object to the reference image plane 121 can be carried out independently. This means that a displacement of the focusing lens 109 of the sight channel 2 does not result in defocusing of the eyepiece lens 112 to the reticle 118 and vice versa.

Since the focusing lens 109 of the sight channel 2 and the focusing lens 110 of the image capturing channel 3 are commonly displaced by actuation of the focusing ring 5 and hence by a movement of the adjusting mechanism 30, the second focusing operation of the sight channel 2 (displacement of the focusing lens 109) at the same time also results in an axial displacement of the image planes of the distant object in the beam path of the image capturing channel 3. The displacement of the image planes in the image plane 3 has the effect of presetting or rough adjustment of the sharpness of the image capturing channel 3. A subsequent fine adjustment of the sharpness of the image is then effected by the autofocus function of the camera and/or the camera module 32. For this purpose, the objective of the camera module 32 that can be changed by the autofocus function of the camera module 32 is automatically adjusted such that a sharp image of the distant object is reproduced on the light-sensitive sensor surface.

The automatic sharpness adjustment of the image in the image capturing channel 3 with the autofocus function of the camera module 32 is preferably started immediately after the actuation of the electronic operating button 13 for triggering image recording. However, as an alternative, initiating the autofocus function of the camera module 32 can also be triggered by the processing unit 31 under program control. For example, movements of the focusing lens 109 and the eyepiece lens 112 can be monitored by the processing unit 31 with the aid of optionally provided sensors. In case of the processing unit 31 determining a sequence of an adjustment of the eyepiece lens 112 with the diopter ring 6 and a subsequent adjustment of the focusing lens 109 by actuation of the focusing ring 5, the processing unit 31 can trigger the autofocus function of the camera module 32 immediately after termination of the movement of the focusing lens 109. The advantage of this is that in case of the use of the mobile application with the function of a live streaming on the electronic terminal 11, each change of focusing of the sight channel 2 by the person operating the long-range optical device 1 at the same time results in corresponding focusing of the image on the electronic terminal 11 without the electronic operating button 13 having to be actuation again for this purpose.

In case of triggering of the autofocus function of the camera module 32 being initiated by the processing unit 31, it is preferably provided that solely the detection of an end of the movement of the focusing lens 109 is used as a criterion. This is due to the fact that as long as the same person is operating the long-range optical device 1, resetting of the eyepiece lens 112 for dioptric correction will not be necessary. Automatic triggering of the autofocus function after termination of manual focusing further has the advantage that when image/video recording is triggered by actuation of the operating button 13, new autofocusing can be omitted. Hence, the entire capturing operation is accelerated significantly, since the time between triggering and actual image recording is shortened recognizably.

By means of an—optionally—integrated compass, the long-range optical device 1 and/or its processing unit 31 can recognize whether an observation phase, in which the long-range optical device 1 is directed towards a distant object that is not moving (the device is at rest), is taking place. If this is the case, as described above, automatic focusing can be started after termination of the manual focusing. It is also conceivable that in the detected observation phase, an automatic image/video recording is started in the background. The image material can for example be evaluated subsequently or in case of manual triggering provide image material from shortly before/after triggering. It would also be possible to carry out an automatic selection with an object classification (e.g. merely birds or faces) using the images captured in the background.

In a representation of an image recorded by the camera module 32 on the display device 38 of the electronic terminal 11 of the observation and image capturing system 20 (FIG. 5), it is also possible that an operator carries out a selection of an image detail of the represented image on the electronic terminal 11 and in response to this, the camera module 32 of the long-range optical device 1 is controlled by the user program (the app) on the electronic terminal 11. Subsequently, the autofocus unit of the camera module 32 refocuses on a corresponding detail of the image detail selected on the electronic terminal 11. Hence, focusing on different details and/or objects at different distances of the represented scenery can be effected on the electronic terminal 11 with otherwise unchanged adjustment and alignment of the long-range optical device 1 to a distant object and/or a corresponding scenery in the field of vision. In case of use of a display device 38 formed by a touchscreen, simple touching of the screen at a position where an object is shown could be used for triggering such focusing by the autofocus unit of the camera module 32 on this object.

The optical systems of the sight channel 2 and the image capturing channel 3 of the long-range optical device 1 according to this exemplary embodiment are defined in more detail in Tables 1 and 2 below by means of their technical data.

Table 1 indicates the optical data of the lens system of the sight channel 2. Therein, "m" refers to the number of the surface according to a count starting at the object-side end of the system. "r" indicates the radius of the curvature of the surface and "d" indicates the distance to the next following surface. In this regard, radii of curvature and distances are stated in mm With regard to the signs of the radii of curvature "r" of the surfaces, the convention otherwise usual in technical optics is used as a basis. This means that the radius is given as the distance from the reference point of the surface, i.e. the point common to the optical axis, to its center of curvature. If this direction (from the reference point of the object towards its center of curvature) is directed just as the direction from the objective to the observer (main direction of propagation of light, z-coordinate), the radius has a positive sign, otherwise the sign is negative. The indication "inf" (="infinity") for the radius r refers to a planar surface. In the fourth column, "glass", the type of glass is stated in the designations of the catalogs of the company Schott AG. An "L" stands for air between the types of glass of two lenses or plates following one another.

TABLE 1

| m | r/mm | d/mm | glass |
|---|---|---|---|
| 1 | inf | 2 | N-BK7 |
| 2 | inf | 30.3 | L |
| 3 | 47.627 | 5.2 | N-SK5 |
| 4 | −55.033 | 1.8 | N-LASF9 |
| 5 | −169.540 | 30 | L |
| 6 | −197.380 | 1.5 | N-FK5 |
| 7 | 158.700 | 12.7 | L |
| 8 | inf | 22.24 | N-BAK4 |
| 9 | inf | 1 | L |
| 10 | inf | 36.25 | N-BAK4 |
| 11 | int | 5.1 | L |
| 12 | −15.784 | 1 | N-BK7 |
| 13 | −255.750 | 2.62 | L |
| 14 | inf | 1.5 | N-BK7 |
| 15 | inf | 4.2 | L |
| 16 | −92.000 | 4.3 | N-LASF44 |
| 17 | −17.700 | 3.8 | L |
| 18 | −68.592 | 1 | 1-DS90 |
| 19 | 15.000 | 7.5 | N-PSK53A |
| 20 | −25.101 | 0.3 | L |
| 21 | 16.535 | 5.4 | N-LAF34 |
| 22 | 148.630 | | |

Table 2 contains the optical data of the lens system of the image capturing channel 3. Therein, the indication "asph" in the second column refers to an aspheric surface of a lens.

TABLE 2

| m | r/mm | d/mm | glass |
|---|---|---|---|
| 1 | inf | 2 | N-BK7 |
| 2 | inf | 1.5 | L |
| 3 | 33.820 | 5.45 | FCD1 |
| 4 | −39.811 | 1.5 | N-LASF43 |
| 5 | 204.370 | 0.45 | L |
| 6 | 29.726 | 3.6 | FCD1 |
| 7 | 98.120 | 16.05 | L |
| 8 | 211.460 | 3.1 | N-SF6 |
| 9 | −27.600 | 1.3 | N-SF10 |
| 10 | 64.590 | 26.77 | L |
| 11 | 9.640 | 5 | N-LASF46A |
| 12 | 12.050 | 5.85 | L |
| 13 | asph | 2.74 | S-LAH60 |
| 14 | asph | 2.42 | L |
| 15 | 18.707 | 4.9 | N-LASF44 |
| 16 | −12.544 | 4 | L |
| 17 | 7.430 | 3.6 | N-LAK12 |
| 18 | −8.725 | 0.9 | N-LAF21 |
| 19 | −26.820 | | |

Figure 12:
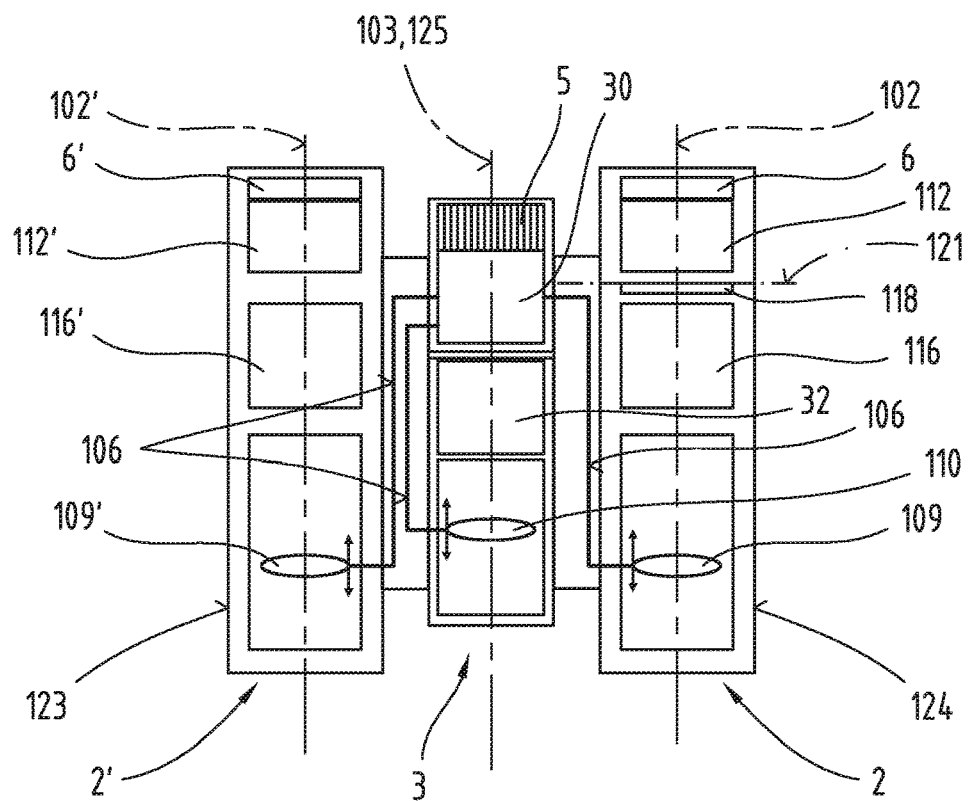
FIG. 12 a further embodiment of the long-range optical device.

By means of FIG. 12, a second exemplary embodiment of a long-range optical device 1 is described. FIG. 12 shows the long-range optical device 1 in a schematically simplified manner Besides the image capturing channel 3 and the sight channel 2, it comprises a second sight channel 2' arranged parallel to the sight channel 2. Thus, the long-range optical device 1 according to this exemplary embodiment is formed as a type of binoculars and/or field glasses. The housing parts 123, 124 holding the two sight channels 2, 2' are connected to one another by a hinged bridge with a pivot axis 125. By pivoting the two housing parts 123, 124 about the pivot axis 125, the relative distance between the two sight channels 2, 102 can be adjusted to the interpupillary distance of a user. Moreover, the image capturing channel 3 is arranged such that its optical axis 103 is positioned coaxially to the pivot axis 125. It is also provided for that the focusing ring 5 is arranged coaxially to the pivot axis 125 as well.

FIG. 12 shows only those optical elements which are directly related to the formation of the beam paths of the two sight channels 2, 2' and the image capturing channel 3. Additionally, the adjusting mechanism 30 with the focusing ring 5 connected thereto and with the push rods 106 is shown, by the actuation of which the focusing lenses 109 of the two sight channels 2, 2' and, moreover, the focusing lens 110 of the image capturing channel 3 can be displaced together for focusing.

The operating measures related to focusing the eyepiece lens 112 of the first sight channel 2 to the reference image plane 121 and subsequent focusing of an image of the distant object to the same reference image plane 121, as described above using the exemplary embodiment according to FIGS. 9 to 11, can be applied in the same way to this exemplary embodiment of the long-range optical device 1. Irrespectively thereof, a dioptric correction between the right and the left eye of a user by adjusting the eyepiece lens 112' of the second sight channel 2' with a diopter ring 6' is also possible. Thus, when operating the long-range optical device 1 according to this binocular exemplary embodiment, subsequently to the focusing steps already described above, an additional focusing operation can be carried out for the second sight channel 2'.

The method for operating the long-range optical device 1 when observing a distant object—in the case of this exemplary embodiment of the long-range optical device 1—comprises the following steps:

a) focusing the first sight channel 2 to the reticle 118 by actuation of the diopter ring 6 (for displacement of the eyepiece lens 112);

b) focusing the first sight channel 2 to a distant object by actuation of the focusing ring 5 (for displacement of the focusing lenses 109, 109' and the focusing lens 110 of the image capturing channel 3);

c) focusing the second sight channel 2' to the same distant object by actuation of the diopter ring 6' (for displacement of the eyepiece lens 112').

After termination of steps a) and b), focusing of the image capturing channel 3 by the autofocus unit can be carried out automatically.

In a further alternative embodiment of the long-range optical device 1, an image of a reticle and/or its marks projected into the beam path of the sight channel 2 can be used in place of the reticle 118 by means of which the location of the reference image plane 121 has been determined. Such an image could have an illuminated mask or an electronic display as its object. Another alternative possibility for the determination of the position of the reference image plane 121 is a transparent display which is arranged in the beam path at the position of the reference image plane 121.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. A long-range optical device comprising at least one sight channel and an image capturing channel with a camera module, wherein the sight channel and the image capturing channel are coupled to one another by means of an adjusting mechanism such that a first image detail observed in the sight channel essentially corresponds to a second image detail captured by the camera module; at least one interface module for establishing a connection with an electronic terminal; a processing unit; at least one memory unit, wherein the memory unit is formed for storing parameters and/or functions, wherein an electronic operating button is provided for retrieving a preselected parameter and carrying out a function, wherein the operating button comprises a measuring device for determining an actuating period, wherein in case of a first actuating period, a first function can be executed and in case of a second actuating period differing from the first actuating period, a second function differing from the first function can be executed.

2. The long-range optical device according to claim 1, wherein a single electronic operating button is provided for executing a plurality of items from the group of parameters and functions.

3. The long-range optical device according to claim 1, wherein a display unit is arranged on the housing, by means of which display unit calling up a parameter and/or executing a function can be visualized.

4. The long-range optical device according to claim 1, wherein the connection is designed as a wireless connection.

5. The long-range optical device according to claim 1, wherein the electronic terminal is designed as a smartphone, which can be coupled to the long-range optical device by means of the wireless connection.

6. The long-range optical device according to claim 1, wherein the operating button comprises a second measuring device for determining a time interval between the actuations of the operating button, wherein in case of a first actuating period, at least one first time interval and at least one second actuating period, a first function can be executed and in case of a third actuating period, at least one second time interval and at least one fourth actuating period, a second function differing from the first function can be executed.

7. The long-range optical device according to claim 6, wherein the second measuring device is coupled to the processing unit, wherein based on the determined actuating period, the determined time interval and/or the determined actuating force, parameters can be called up and/or functions can be executed.

8. The long-range optical device according to claim 1, wherein the operating button comprises a further measuring device for determining an actuating force, wherein in case of a first actuating force, a first function can be executed and in case of a second actuating force differing from the first actuating force, a second function differing from the first function can be executed.

9. The long-range optical device according to claim 8, wherein the further measuring device is coupled to the processing unit, wherein based on the determined actuating period, the determined time interval and/or the determined actuating force, parameters can be called up and/or functions can be executed.

10. The long-range optical device according to claim 1, wherein a support unit is formed, in which support unit at least one first housing of the sight channel, a second housing of the image capturing channel, the adjusting mechanism, the interface module and the processing unit are arranged.

11. The long-range optical device according to claim 10, wherein a first heat dissipation device is formed between the support unit and the processing unit and/or that a second heat dissipation device is formed between the support unit and the first housing of the sight channel and/or that a third heat dissipation device is formed between the housing of the long-range optical device and the camera module.

12. An observation and image capturing system comprising a long-range optical device according to claim 1 and an electronic terminal, wherein the long-range optical device and the electronic terminal are coupled to one another via a connection at least temporally.

13. An observation and image capturing system according to claim 12, wherein the electronic terminal comprises a display device, on which display device an image and/or an image sequence captured by means of a camera module of the long-range optical device can be displayed.

14. The observation and image capturing system according to claim 12, wherein an application software is installed on a server device, which application software can be accessed by means of the electronic terminal and/or which application software can be executed by means of the electronic terminal.

15. The long-range optical device according to claim 1, wherein the measuring device is coupled to the processing unit, wherein based on the determined actuating period, the determined time interval and/or the determined actuating force, parameters can be called up and/or functions can be executed.

16. The observation and image capturing system according to claim 14, wherein the server device comprises a memory system, in which an image and/or an image sequence captured by means of the camera module of the long-range optical device can be stored.

17. The observation and image capturing system according to claim 14, wherein parameters and/or functions can be created and/or edited by means of the application software on the electronic terminal, wherein parameters and/or functions can be transmitted from the electronic terminal to the long-range optical device (1) and vice versa via the connection.

18. A long-range optical device comprising at least one sight channel and an image capturing channel with a camera module, wherein the sight channel and the image capturing channel are coupled to one another by means of an adjusting mechanism such that a first image detail observed in the sight channel essentially corresponds to a second image detail captured by the camera module; at least one interface module for establishing a connection with an electronic terminal; a processing unit; at least one memory unit, wherein the memory unit is formed for storing parameters and/or functions, wherein an electronic operating button is provided for retrieving a preselected parameter and carrying out a function, wherein the operating button comprises a measuring device for determining a time interval between the actuations of the operating button, wherein in case of a first actuating period, at least one first time interval and at least one second actuating period, a first function can be executed and in case of a third actuating period, at least one second time interval and at least one fourth actuating period, a second function differing from the first function can be executed.

19. The long-range optical device according to claim 18, wherein the measuring device is coupled to the processing unit, wherein based on the determined actuating period, the determined time interval and/or the determined actuating force, parameters can be called up and/or functions can be executed.

20. The long-range optical device according to claim 18, wherein the operating button comprises a further measuring device for determining an actuating force, wherein in case of a first actuating force, a first function can be executed and in case of a second actuating force differing from the first actuating force, a second function differing from the first function can be executed.

21. The long-range optical device according to claim 18, wherein the further measuring device is coupled to the processing unit, wherein based on the determined actuating period, the determined time interval and/or the determined actuating force, parameters can be called up and/or functions can be executed.

22. A long-range optical device comprising at least one sight channel and an image capturing channel with a camera module, wherein the sight channel and the image capturing channel are coupled to one another by means of an adjusting mechanism such that a first image detail observed in the sight channel essentially corresponds to a second image detail captured by the camera module; at least one interface module for establishing a connection with an electronic terminal; a processing unit; at least one memory unit, wherein the memory unit is formed for storing parameters and/or functions, wherein an electronic operating button is provided for retrieving a preselected parameter and carrying out a function, wherein the operating button comprises a measuring device for determining an actuating force, wherein in case of a first actuating force, a first function can be executed and in case of a second actuating force differing from the first actuating force, a second function differing from the first function can be executed.

23. A long-range optical device comprising at least one sight channel and an image capturing channel with a camera module, wherein the sight channel and the image capturing channel are coupled to one another by means of an adjusting mechanism such that a first image detail observed in the sight channel essentially corresponds to a second image detail captured by the camera module; at least one interface module for establishing a connection with an electronic terminal; a processing unit; at least one memory unit, wherein the memory unit is formed for storing parameters and/or functions, wherein an electronic operating button is provided for retrieving a preselected parameter and carrying out a function, wherein a support unit is formed, in which support unit at least one first housing of the sight channel, a second housing of the image capturing channel, the adjusting mechanism, the interface module and the processing unit are arranged, wherein a first heat dissipation device is formed between the support unit and the processing unit and/or that a second heat dissipation device is formed between the support unit and the first housing of the sight channel and/or that a third heat dissipation device is formed between the housing of the long-range optical device and the camera module.

* * * * *